UNITED STATES PATENT OFFICE.

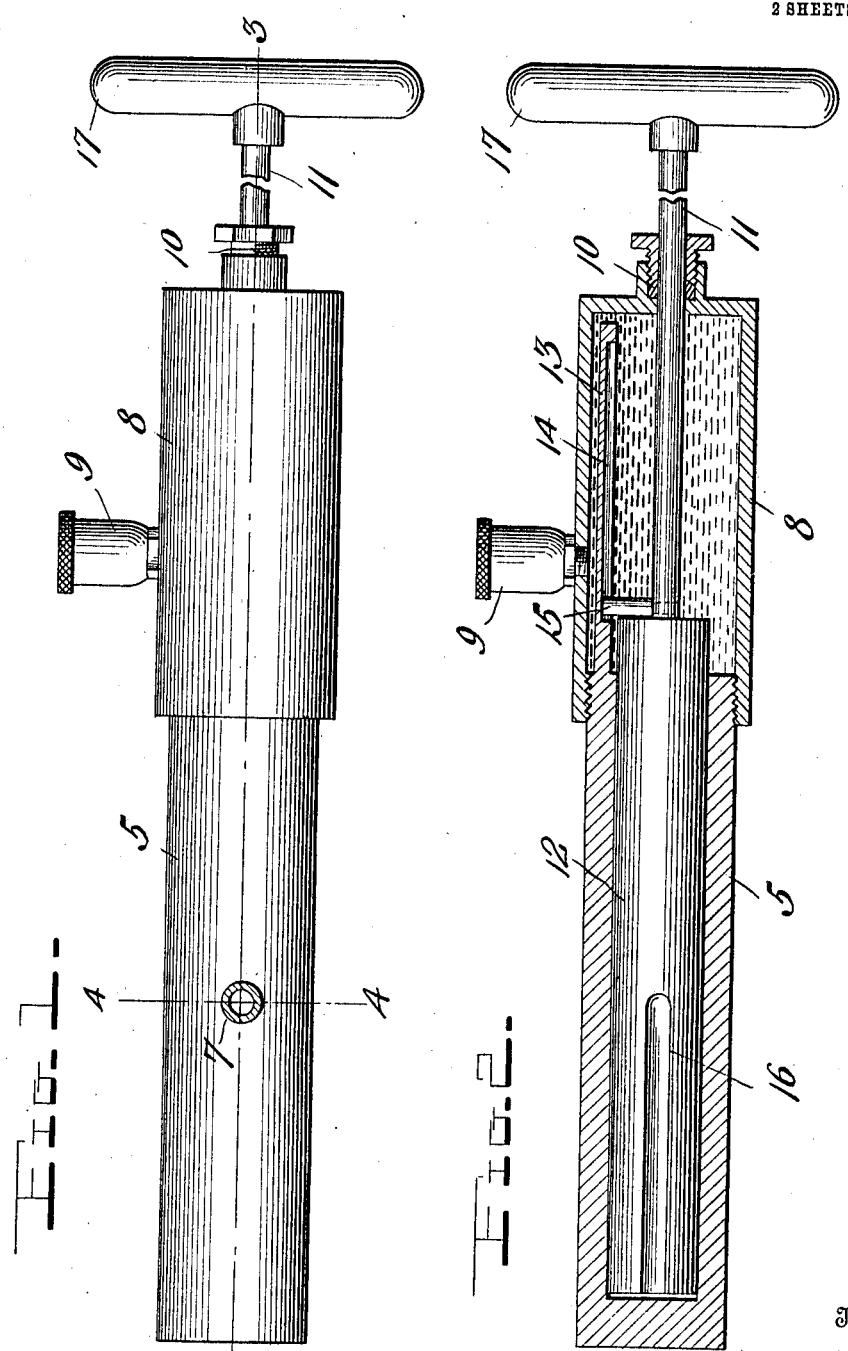

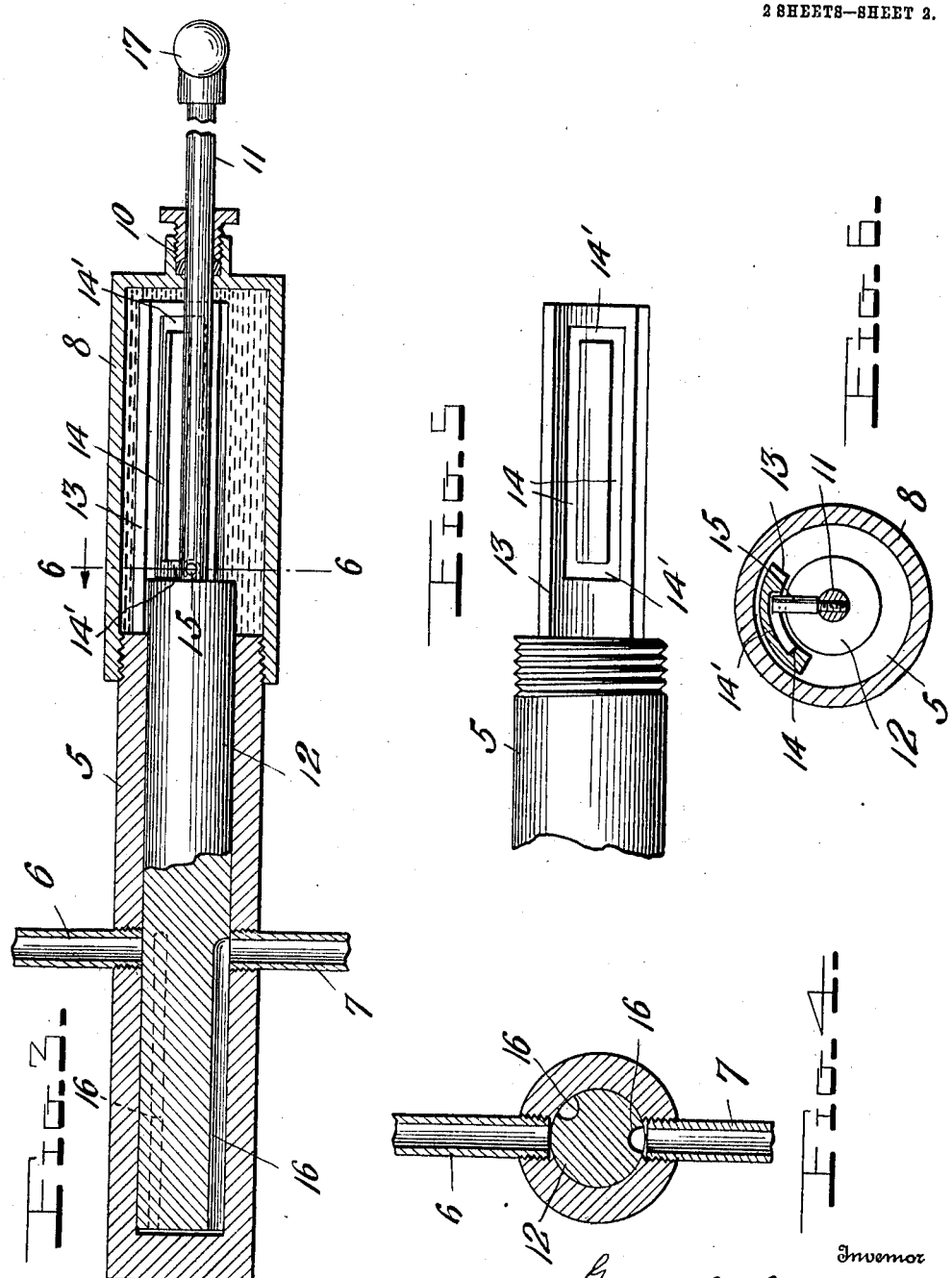

GEORGE J. DOURTE, OF LONGMONT, COLORADO.

PUMP.

970,435. Specification of Letters Patent. Patented Sept. 13, 1910.

Application filed November 3, 1909. Serial No. 526,102.

*To all whom it may concern:*

Be it known that I, GEORGE J. DOURTE, a citizen of the United States, residing at Longmont, in the county of Boulder and State of Colorado, have invented certain new and useful Improvements in Pumps, of which the following is a specification, reference being had to the accompanying drawings.

This invention relates to certain new and useful improvements in pumps, and has for its object to provide a device of this character which may be conveniently operated by hand or mechanical power.

A further object resides in the provision of means whereby the pump piston may be kept thoroughly lubricated at all times.

A further object of the invention resides in the entire elimination of valves and other accessories which are easily rendered inoperative and the efficiency of the pump impaired.

With these and other objects in view, the invention consists of the novel construction, combination and arrangement of parts hereinafter fully described and claimed, and illustrated in the accompanying drawings, in which—

Figure 1 is a side elevation of a pump embodying my invention; Fig. 2 is a vertical longitudinal section thereof; Fig. 3 is a similar section taken on the line 3—3 of Fig. 1; Fig. 4 is a transverse section taken on the line 4—4 of Fig. 1; Fig. 5 is an enlarged elevation of one end of the pump cylinder showing the piston guide plate; and Fig. 6 is a transverse section taken on the line 6—6 of Fig. 3.

Referring to the drawings 5 indicates a pump cylinder in which at diametrically opposite points, an inlet and outlet pipe 6 and 7 respectively, have threaded engagement. A lubricant cylinder 8 is provided with interior threads in one end for engagement upon the threaded end of the pump cylinder 5. Within this cylinder a suitable lubricant is adapted to be carried, and the chamber thereof may be readily replenished through the oil cup 9 which is threaded in the cylinder. In the outer end or head of the cylinder 8 a stuffing box 10 is arranged. A piston rod 11 extends through this stuffing box and into the lubricant chamber. A piston 12 is disposed within the pump cylinder 5 and is integrally formed with the stem 11, said piston having longitudinal reciprocatory movement within the cylinder. Extending rearwardly from the end of the pump cylinder and into the lubricating cylinder there is a guide plate 13. This plate is arcuate in cross section as shown in Fig. 6 and is provided in its inner surface with a groove or channel 14. This channel is substantially rectangular in form and comprises the two parallel longitudinal portions and the end connecting portions 14', whereby one continuous channel is formed. Secured in the stem 11 adjacent to the end of the piston 12 is a stud 15 which extends transversely from the stem and has its outer end disposed in the guide channel 14.

The inlet and outlet pipes 6 and 7 of the pump cylinder may be located at any preferred point between the ends of the cylinder, but as shown in the drawings I preferably dispose these pipes centrally thereof.

The piston 12 is provided with the two longitudinal grooves 16 which extend inwardly from its outer end to a point in alinement with the inner ends of the inlet and outlet pipes when the piston is at the limit of its stroke. As shown in Fig. 4 these grooves are not disposed at diametrically opposite points in the cylinder, but one of them is located to one side of the inlet pipe when the other is in communication with the outlet pipe, or vice versa. Upon the outer end of the piston stem 11 a hand grip 17 is secured by means of which the piston 12 may be reciprocated.

In the operation of the device, when the piston is drawn backwardly in the cylinder 5, and the extremity thereof disposed in the rear of the inlet pipe 6, a vacuum is formed in the cylinder which is rapidly filled by the entrance through the pipe 6 of the material being pumped. At this point the stud 15 is located in the rear end of the upper longitudinal channel 14 of the guide plate. The stem 11 is then turned, the stud moved in the end portion of the channel 14, thus rotating the piston and moving the upper longitudinal groove 16 out of communication with the inlet pipe 6. Upon the inward movement of the piston 12, the stud 15 travels in the lower horizontal portion of the slot 14 and the material is forced through the other of the grooves 16 of the piston and discharged through the pipe 7. The piston 12 is then again rotated to return the other of the grooves therein to registering position with the pipe 6 and the operation repeated. In this manner the material may be rapidly drawn into and discharged from the pump cylinder, and with each stroke of the piston the stem 11 and the piston 12 will be thoroughly lubricated.

If desired the piston 12 may be provided with a plurality of intake and outlet grooves 16 whereby the material may be pumped in larger quantities, and two or more inlet and outlet pipes 6 and 7 may also be provided. In lieu of the hand grip 17 the end of the piston stem may be suitably connected to any desired source of power whereby a mechanically operated pump may be provided.

From the foregoing it is believed that the operation and many advantages to be derived from my invention will be readily understood without further description.

The lubricant cylinder may be readily removed from the end of the pump cylinder and thoroughly cleaned or excess grease which may have coagulated therein be removed whereby the positive operation of the piston may be at all times assured.

While I have shown and described what I believe to be the preferred form of my invention it will be obvious that numerous minor modifications may be resorted to without departing from the essential features or sacrificing any of the advantages of my invention.

Having thus described the invention, what is claimed is:

1. A pump comprising a pump cylinder, a lubricant cylinder removably engaged on one end thereof, a piston adapted for reciprocatory movement in said cylinder, a piston stem extending through the rear end of the lubricant cylinder, inlet and outlet pipes extending into said pump cylinder, said piston having grooves adapted to communicate with said pipes, and a guide carried by the end of said pump cylinder extending into the lubricant cylinder adapted to retain the grooves in said piston in communication with the inlet and outlet pipes, substantially as and for the purpose set forth.

2. A pump comprising a pump cylinder, a lubricant cylinder having threaded engagement on one end thereof, an elongated piston adapted for reciprocatory movement in said pump cylinder, the stem of said piston extending through the rear end of the lubricant cylinder, an inlet and outlet pipe threaded into the pump cylinder at diametrically opposite points, said piston having longitudinal grooves extending inwardly from its outer end, said grooves being adapted for alternate registration with the inlet and outlet pipes upon the reciprocation of the piston, a guide extending longitudinally into the lubricant chamber, and means carried by the piston stem coöperating with said guide to retain one of the piston grooves in communication with the inlet or outlet pipe.

3. A pump comprising a pump cylinder and a lubricant cylinder, said pump cylinder having inlet and outlet pipes threaded therethrough at diametrically opposite points, a piston disposed within said cylinder and extending the entire length thereof, said piston being adapted for reciprocatory movement within the pump cylinder and lubricant cylinder and having longitudinally extending grooves extending inwardly from its outer end, said grooves being disposed out of alinement and adapted to be alternately brought into registration with the inlet or outlet pipe, an arcuate guide plate carried by the pump cylinder extending into the lubricant cylinder, the stem of said piston extending through a stuffing box on the rear end of said lubricant cylinder, and a laterally extending stud carried by said stem engaging with said guide plate to retain either of the grooves in communication with its respective pipe.

4. A pump comprising a pump cylinder, a lubricant cylinder removably engaged on one end thereof, an inlet and outlet pipe centrally disposed through the cylinder wall at diametrically opposite points, an elongated piston adapted for reciprocatory movement in said cylinder and entirely filling the same, a piston stem extending through the rear end of the lubricating cylinder, an arcuate guide plate carried by the pump cylinder and extending rearwardly therefrom into the lubricant chamber, said plate having a rectangular channel in the inner concave face thereof, said piston having longitudinal grooves extending inwardly from its outer end, one of said grooves being disposed in registration with the inlet or outlet pipe, said piston having limited rotation in the cylinder to alternately move said grooves into registration with their respective pipes, and a laterally extending stud carried by the piston stem having its outer end disposed in the channel in said guide plate, said pin being adapted to guide the piston and prevent rotative movement of the same between the opposite ends of the stroke to maintain the proper disposition of the grooves with relation to the inlet and outlet pipes, substantially as and for the purpose set forth.

In testimony whereof I hereunto affix my signature in the presence of two witnesses.

GEORGE J. DOURTE.

Witnesses:
E. G. HOLDEN,
ALBERT DAKAN.